United States Patent

Bonk et al.

[15] 3,644,168

[45] Feb. 22, 1972

[54] VARIED DENSITY POLYISOCYANURATE FOAM STRUCTURE

[72] Inventors: Henry W. Bonk, Wallingford; Robin L. Grieve, North Guilford; Herbert G. Nadeau, North Haven; Peter G. Palmer, Wallingford, all of Conn.

[73] Assignee: The Upjohn Company, Kalamazoo, Mich.

[22] Filed: June 12, 1970

[21] Appl. No.: 45,756

Related U.S. Application Data

[63] Continuation-in-part of Ser. No. 798,103, Feb. 10, 1969.

[52] U.S. Cl. ............................... 161/160, 161/161, 161/165, 161/166, 161/190, 260/2.5 AW, 264/41, 264/45
[51] Int. Cl. ................... B32b 3/26, B32b 5/14, B29d 27/00
[58] Field of Search ............. 264/41, 45; 161/159, 160, 161, 161/165, 166, 190; 260/2.5 AW

[56] References Cited

UNITED STATES PATENTS

| | | | |
|---|---|---|---|
| 3,072,582 | 1/1963 | Frost | 260/2.5 |
| 3,158,529 | 11/1964 | Robitschek | 161/161 |
| 3,178,490 | 4/1965 | Petrino et al. | 264/41 |
| 3,382,302 | 5/1968 | Marzocchi | 264/45 |
| 3,431,331 | 3/1969 | Pincus et al. | 264/45 |
| 3,546,060 | 12/1970 | Hoppe et al. | 264/45 |

Primary Examiner—William J. Van Balen
Attorney—Denis A. Firth and John Kekich

[57] ABSTRACT

A novel structural material is described. The material is a rigid cellular polymer having an integrally formed continuous noncellular surface layer. There is an abrupt change of density at the juncture of the inner cellular core and the outer noncellular layer, the thickness of the latter being not less than about 0.25 millimeters. The inner cellular core and the outer noncellular layer are of uniform chemical composition and comprise a polymer having isocyanurate moieties as the major recurring chemical linkages and oxazolidinone, amide, imide, and urethane moieties as minor recurring units. Optionally the novel structural material can contain fillers and/or reinforcing elements. The novel structural material is further characterized by high-insulating capacity, high-structural strength and high resistance to heat and to flame spread. It can be used in place of sheet metal, wood, reinforced resin and the like, in the fabrication of automobiles, appliances, furniture, buildings, marine vessels, sporting goods equipment, pipe insulation, and many allied fields.

11 Claims, 3 Drawing Figures

PATENTED FEB 22 1972 3,644,168

HENRY W. BONK
ROBIN L. GRIEVE
HERBERT G. NADEAU
PETER G. PALMER
   INVENTORS

BY *Denis A Litho*
   Agent

VARIED DENSITY POLYISOCYANURATE FOAM STRUCTURE

CROSS-REFERENCE TO RELATED APPLICATIONS

This application is a continuation-in-part of application Ser. No. 798,103, filed Feb. 10, 1969.

BACKGROUND OF THE INVENTION

1. Field of the Invention

This invention relates to novel polymeric materials and is more particularly concerned with rigid polymeric materials having a cellular core and an integrally formed outer noncellular surface layer, the polymeric material being of uniform chemical composition in which the major recurring unit is an isocyanurate moiety.

2. Description of the Prior Art

The rapid advances in polymer chemistry in recent years have led to an ever increasing use of such synthetic materials for fabrication of structures which have hitherto been prepared from wood, metal, glass and the like conventional materials. Reinforced polyester resins are now widely used in a variety of structural applications. Laminates having a core of rigid cellular polymer and outer layers of sheet metal, wood and/or rigid plastics are finding increasing use particularly in the building industry since they combine the heat insulating properties of the cellular polymer with the structural strength properties of the conventional exterior layer material.

Both the reinforced polyester resins and the laminates require a multistep fabricating operation and generally require final trimming, machining, or cutting before the desired object is ready for use.

More recently the production of self-skinned rigid polyurethanes has been described. These foams are derived in a single molding operation from a polyurethane foam reaction mixture and are molded under such conditions that an outer noncellular skin is produced on the surface of the foam which contacts the mold walls. The inner core of the molded object is cellular. The production of such self-skinned polyurethane foams, otherwise known as integrally skinned foams, represents a marked advance in the art in that it greatly simplifies the production of molded structural units of a wide variety of shapes. However, the skinned foams so produced suffer the disadvantage that they have relatively low structural strength properties and, more particularly, have low resistance to deformation by heat. The number of applications to which the material can be put is therefore limited.

We have now provided a novel structural material which combines the advantages of fabrication by molding in a one-step procedure, with high structural strength and very high resistance to deformation by heat. The material is, accordingly, highly useful and can be employed as a replacement for most existing materials conventionally employed for structural purposes in the building, automotive, shipbuilding and like industries.

SUMMARY OF THE INVENTION

In its broadest aspect our invention comprises a novel rigid structural polymeric material having a continuous integrally formed noncellular polymeric outer layer and an inner cellular polymeric core and being further characterized by:

a. an abrupt change of density at the juncture of said noncellular outer layer and said inner cellular core;

b. a thickness of at least 0.25 millimeters in said noncellular outer layer; and c. uniformity of chemical composition of polymer throughout said inner polymeric core and said outer polymeric layer, the major recurring chemical linkage of said polymer being an isocyanurate moiety.

The invention also comprises novel structural materials having the above characteristics and additionally having fillers and/or reinforcing means incorporated therein, as will be discussed hereinafter.

DETAILED DESCRIPTION OF THE INVENTION

Figure 1:
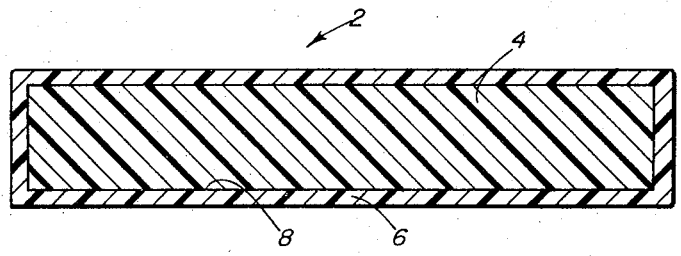
FIG. 1 shows a cross-sectional view of a panel of structural material of the invention.

As set forth above, this invention provides a rigid polymer foam material on the surface of which there is a rigid, relatively thick, substantially continuous skin, which skin has been integrally formed, i.e., has been generated in situ by the polymer foam producing mixture. Said skin is possessed of high structural integrity, high resistance to deformation by heat or by low temperatures, high resistance to abrasion and high resistance to flame spread. Said skin is also relatively impervious to moisture and can be readily painted by dipping or coating. The high thermal stability and resistance to deformation of the articles of the invention enable the skin to be coated by dipping in hot coated solutions followed by rapid heat curing of the coating in ovens and the like.

By appropriate design of the surfaces of the mold in which the articles of the invention are prepared, there can be imparted permanently to the surface of the skin such markings, indentations or bas relief work as are necessary to produce a wood or leather grain or other such surface appearance as may be desired.

The skin on the novel material of the invention is truly a skin. That is to say, said skin has a finite thickness of at least about 0.25 millimeter, and the point at which the inner boundary of the skin meets the cellular core is clearly apparent to the eye when a cross-sectional sample of a foam of the invention is inspected. So clearly defined is the boundary that it is difficult to realize, from a casual glance, that the skin and foam have not been produced separately and subsequently bonded together.

The skin formed on the outer surface of the novel foams of the invention is microcellular, i.e., is a solid having minute cells encapsulated therein, said cells being randomly distributed and forming no part of a regular cellular matrix such as is found in ordinary polymer foams. Said skin generally has a minimum thickness of about 0.25 millimeter. The thickness of the skin can be varied by appropriate modification of the process of preparation of the foam, particularly insofar as the degree of packing and overall density are concerned, as is discussed hereinafter. Skin thickness as high as about 3.0 millimeters can be achieved. The thickness of skin on any given foam of the invention remains fairly uniform throughout its entirety even when said foams are molded in shapes having narrow projections such that the width of cross section of the foam thereat approaches twice the average thickness of the skin with little core material present between the skins.

The density of the skin has been found to be fairly constant and substantially independent of the density of the cellular core. Thus the density of said skin is generally between about 60 and 65 pounds per cubic foot irrespective of the density of the core foam.

The cellular core of the self-skinned foam of the invention is generally of substantially uniform density. As pointed out above, the boundary between the skin and the core is clearly delineated and is marked by an abrupt change in density. The density and cell structure of the cellular core, in that portion which abuts the skin, are not substantially different from the density and cell structure, respectively, of the central portion of the core. In general the density of said cellular core can vary from about 5 pcf to about 50 pcf. Preferred integrally skinned rigid foams of the invention have a core density within the range of about 15 pcf to about 30 pcf. Any required density of the core within the above limits can be achieved by adjusting various factors, principally the degree of packing of the mold, and the amount of blowing agent employed in the formulation, as is discussed in more detail below.

The further distinguishing characteristic of the rigid self-skinned foams of the invention lies in the nature of the chemical composition of the polymer therein. The outer noncellular layer and the inner cellular core are formed simultaneously from the same polymer foam reaction mixture, and, accordingly, there is homogeneity of chemical composition in the polymer of the inner and outer layers. As will be discussed hereinafter in more detail, the polymer foams of the invention are prepared by reacting an organic polyisocyanate with a trimerization catalyst combination. Hence the major recurring unit in the resulting polymer chain is the isocyanurate moiety, i.e., the moiety having the structure:

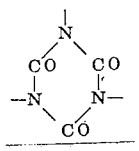

wherein each of the free valencies attached to N is linked to the organic residue of the polyisocyanate starting material. By "major recurring unit" is meant that at least 50 percent of the total number of the recurring units in the polymer chain are of the above structure. On the basis of the major contribution made by the above unit to the chemical structure of the polymer, the latter is appropriately termed a polyisocyanurate.

However, it is to be understood that the chemical structure and compositions of the polymer foams of the invention need not be exclusively composed of isocyanurate moieties. A minor proportion i.e., less than 50 percent, and generally less than 10 percent of the total number of units in the polymer chemical structure, can be moieties other than isocyanurate, depending upon the particular polymer foam system employed in the preparation of the novel foams of the invention. For example, when a monomeric epoxide is employed as part of the catalyst combination in the foam reaction mix, there will be present in the end product a minor proportion of oxazolidinone moieties, i.e., moieties having the structure:

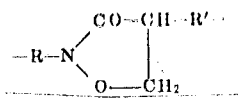

wherein R represents the residue of the organic polyisocyanate starting material and R' represents the residue of the monomeric epoxide starting material.

Similarly, as will be discussed hereinafter, a minor proportion of dicarboxylic acid anhydride can be added to the foam reaction mixture and this material, by reaction with the organic polyisocyanate, will give rise to a minor proportion of imide moieties in the chemical structure of the final polymer, i.e., moieties having the structure:

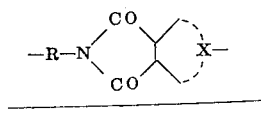

wherein R represents the residue of the organic polyisocyanate starting material and X represents the residue of the carboxylic anhydride starting material.

In a further embodiment of the novel foams of the invention, a minor proportion, as hereinbefore defined, of a polycarboxylic acid can be added to the foam reaction mixture and this material, by reaction with the organic polyisocyanate, will give rise to a minor proportion of amide moieties in the chemical structure of the final polymer. Illustratively, by employing a dicarboxylic acid in this manner, minor proportions of moieties of the structure:

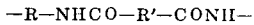

wherein R is the residue of the organic polyisocyanate and R' is the residue of the dicarboxylic acid, will be present in the chemical structure of the final polymer.

In certain instances there can be added to the polymer foam reaction mixture, a minor amount of a polyol. The latter reacts with the organic polyisocyanate in the preparation of the polymer foam and gives rise to a minor proportion of urethane linkages, i.e.,

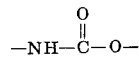

linkages, in the chemical structure of the final polymer.

The above types of recurring unit are those which are present in the molecular structure of the polymer in the novel rigid self-skinned foams. The presence of a combination of some or all of said recurring units is chiefly responsible for the remarkable physical properties of the foams. The various units are generally arranged in random fashion but partial ordering of said units is possible, as by pretreatment of the polyisocyanate prior to polymerization, is desired. The latter possibility will be discussed in more detail hereafter.

It is to be understood that minor proportions, generally less than 10 percent of the total number of recurring units, of additional recurring chemical units other than those specifically set forth above can be present in the chemical structure of the polymers of this invention provided that the presence of said additional recurring chemical units does not detract from the overall desirable properties of the self-skinned polymer foam.

In FIG. 1 there is shown, in cross-sectional view, a specific embodiment of the invention, namely a rigid self-skinned polymer foam in the form of a modular panel. The panel 2 has an inner rigid cellular core 4 which is completely surrounded by a rigid microcellular skin 6. The boundary 8 between the core 4 and the skin 6 is clearly visible to the naked eye and is marked by an abrupt change of density between the core 4 and the skin 6. The cellular core 4 is a uniform substantially closed cell matrix. The cellular core 4 and the rigid microcellular skin 6 are chemically homogeneous, i.e., the chemical structure of the polymer molecules in both the cellular core 4 and the skin 6 is identical. The chemical structure is that discussed above, and the major recurring unit therein is the isocyanurate moiety.

Figure 2:
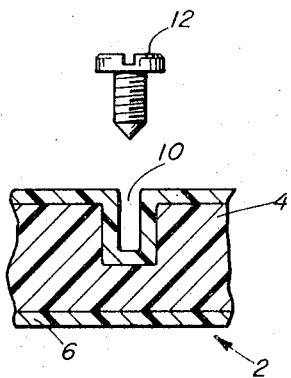
FIG. 2 shows a partial cross-sectional view of a second specific embodiment of the invention.

FIG. 2 shows a partial cross-sectional view of a modular panel 2 according to the invention, said panel being provided with means for securing a self-tapping screw therein. Said panel 2 is provided with a cylindrical opening 10 having a bore which is slightly smaller than the diameter of the threaded portion of the self-tapping screw 12. It is found that the screw 12 can be screwed into the opening 10 thereby producing corresponding threads on the inner wall of the opening 10.1. The screw 12 after insertion is tightly held in the opening 10 and withstands tremendous force exerted thereon without separation. Indeed, attempts to remove the screw inserted by exerting pulling forces thereon in standard pulling tests result in structural failure of the core and skin surrounding the insert before the point is reached at which the screw can be stripped from the threads formed in the opening 10. Further the screw 12 can be unscrewed and replaced a plurality of times without distortion of the opening 10 or of the surrounding foam.

The opening 10 in the modular panel can be formed readily during the molding of the panel 2 by inserting the appropriate cylindrical projection in the desired place in the wall of the mold in which the panel is prepared. The thickness and properties of the skin which surrounds the opening 10 are indistinguishable from those of the skin 6 surrounding the remainder of said panel 2.

As will be obvious to one skilled in the art, a plurality of such openings 10 can be provided in the modular panel 2 and can be disposed at points on the panel at which it is desired to attach shelves, brackets, plates and the like. Similar openings can be provided for like purposes in any of the varied types of structural units prepared using the rigid polymer foams of the invention. The ability to receive and retain self-tapping screws in the above manner represents a further remarkable property of the polymer foams of the invention.

The embodiments of FIGS. 1 and 2 illustrate merely one of the many hundreds of possible structural forms into which the polymer foams of the invention can be molded by appropriate choice of mold. The possible applications of the polymer foams of the invention are virtually unlimited. Thus, the rigid polymer foams of the invention can be used to replace any of the structural materials presently employed in the art subject only to the limitations on material requirement dictated by any particular use under consideration. The polymer foams, in any given application, have a clear advantage over whatever conventional material is employed in the same application, by reason of the ease of fabrication of even the most complicated object using low cost tools and the elimination of any machining of the fabricated part. In addition the polymer foam article has excellent surface characteristics and can be given any desired skin pattern or graining merely by use of a mold having the appropriate surface indentations.

As will be apparent from the data on physical properties set forth in the examples hereinafter, the novel polymer foams of the invention are characterized by surface hardness and by high flexural strength, tensile strength, compressive strength, shear strength, and K factor (heat insulation). As also will be apparent from the data given in the specific examples, one of the principal distinguishing properties of the novel polymer foams is their extreme resistance to flame spread and to distortion or loss of integrity on exposure to heat. Illustratively, the novel polymer foams of the invention exhibit a coefficient of linear thermal expansion (parallel to the skin surface) of the order of $2.5 \times 10^{-5}$ in./in./°F. and a burn through time in excess of 5 hours in the Bureau of Mines Flame Penetration Test (see Mitchell et al., R.I. Bureau of Mines Report of Investigations 6366, 1964). In addition to their high strength and heat resistance, the novel polymers of the invention have very high electrical insulating properties which makes them outstandingly useful in a variety of structural applications. In short the novel polymers of the invention possess a unique combination of physical and electrical properties such as is found in very few other structural materials and certainly not in any known structural material which lends itself so readily to the mass production of components.

As set forth above, the possible uses of the polymer foams of the invention are legion. They can be used as substitute for conventional types of structural material in the fabrication of many thousands of different items in many and varied fields of art. The following is an illustrative list of the principal areas in which the polymer foams of the invention can be employed in place of existing structural materials. The list is, by no means, exhaustive and is not intended to be limiting since many additional ways of utilizing the polymer foams of the invention will be obvious to one skilled in the art. The list of illustrative uses of the polymer foams of the invention is inclusive of:

transportation applications including passenger cars, trucks, coaches, railroad rolling stock, airplanes, hovercraft and the like in which the polymer foams of the invention can be used as interior and exterior body panels, roofs, fenders, flow pans, airscoops, grille components, structural members of seats, luggage racks, heater housings, instrument panel assemblies assemblies, compartments and the like;

furniture applications in which the polymer foams of the invention replace wood, metal, other plastics and the like, such applications including chairs, tables, cabinetry, decorative moldings, doors and the like;

appliances such as the exterior walls and housing of washers, dryers, ovens, refrigerators, freezers, television and radio receivers, electric switchboxes, fan blades and the like;

building and like construction applications such as structural panels for walls, ceilings, siding, window and door frames, low-cost housing components, room modules and the like;

marine construction applications including hulls, bulkheads, lockers, centerboards of yachts, paneling, cabinetry, rudders and the like;

sporting goods equipment such as skis, toboggans, ski-mobiles, surf boards, camping trailers, caravans, and the like; and pipes and conduits and the like, which by reason of the low K factor provide built-in heat insulation, and which possess high resistance to corrosion by acids, alkalies and other fluids which normally generate a high rate of corrosion in conventional metal pipes and conduits.

The novel rigid self-skinned foams of the invention can be prepared using any of the foam systems known in the art to produce polymer foams in which the major recurring unit is the isocyanurate moiety, provided that (1) the foam reaction mixture is free from extraneous water, (2) the amount of blowing agent employed is at a markedly higher level than conventionally employed, as discussed hereinafter, and (3) the foaming is carried out in a closed mold of a volume less than that which would be occupied by the resultant foam if the polymer foam forming reaction mixture were allowed to rise freely.

The preparation of polyisocyanurate foams i.e., foams in which the isocyanurate moiety is the major recurring unit in the polymer chain) is described in, for example, British specifications 1,104,394 and 1,146,661, in German Specification 1,904,575, in Netherlands Specification 68/04131, and in Journal of Cellular Plastics, Jan. 1965 at pages 85–90.

In general the preparation of such polyisocyanurate foams involves reacting an organic polyisocyanate with a trimerization catalyst under foam producing conditions. The trimerization catalysts employed include tertiary organic amines optionally, but preferably, in combination with an epoxide, preferably a monomeric homocyclic polyepoxide as hereinafter defined.

By "foam producing conditions" is meant conditions well recognized in the art as being necessary for the preparation of polymer foams from chemically reactive components. Thus, in the present instance the polyisocyanate and trimerization catalyst are brought together at a temperature within the range of about 15° C. to about 50° C. in the presence of a blowing agent. Surfactants, cell stabilizers, and like adjuvants, commonly employed in the art to improve or control the quality of the resultant foam, can be employed if desired. In addition to the polyisocyanate, catalyst, blowing agent, and conventional adjuvants, there can be present in the reaction mixture a minor amount, advantageously less than about 50 percent by weight of polyisocyanate and preferably less than about 20 percent by weight of polyisocyanate, of a polyol, as hereinafter defined, and/or a polycarboxylic acid or polycarboxylic polyanhydrides, as hereinafter defined. The presence of polyol in the reaction mixture will give rise to a minor proportion of urethane linkages in the resulting polymer as was discussed previously. The presence of polycarboxylic acid anhydride in the reaction mixture will give rise to a minor proportion of imide moieties in the resulting polymer as was discussed previously. Similarly, the presence of polycarboxylic acid in the reaction mixture will give rise to the presence of amide moieties in the resulting polymer. The amounts of polycarboxylic acid and/or polycarboxylic anhydride employed in the reaction are so chosen that the percentage of amide and/or imide moieties in the resulting polymer is within the limits set forth hereinabove.

In adapting the above known methods of preparation of polyisocyanurate foams to the preparation of novel rigid, self-skinned foams of the invention, the three conditions enumerated above must be met. Firstly, the foam reaction must be carried out in the absence of extraneous water. That is to say, the small amounts of water (of the order of about 0.1 percent per weight) which are present in commercially available polyols, and which are thereby carried into the foam reaction mix whenever a polyol is incorporated therein, can be tolerated but the addition of any further quantities of water, in excess of the amounts intrinsically incorporated with the polyol, is fatal to success. This requirement is expressed throughout the specification and claims as "the absence of extraneous water" in the foam reaction mixture.

The second way in which the prior art processes of preparing polyisocyanurates have to be modified, in order to produce the novel self-skinned rigid polymer foams of the invention, follows naturally in part from the above requirement. Thus, in the absence of extraneous water the blowing agent employed in accordance with the invention is a polyhalogenated aliphatic hydrocarbon such as those conventionally employed as blowing agents in the preparation of rigid polyurethane foams. By "polyhalogenated" is meant that at least two halogen atoms are present in the molecule. Said polyhalogenated aliphatic hydrocarbon blowing agents have boiling points ranging from about −40° C. to about 110° C. depending upon the particular type of foam to be produced. Examples of polyhalogenated aliphatic hydrocarbons are trichloromonofluoromethane, dichlorodifluoromethane, chlorotrifluoromethane, 1,1-dichloro-1-fluoroethane, 1,1-difluoro-1,2,2-trichloroethane, 1,1,1-tribromo-2-chloro-2-fluorobutane and the like. Mixtures of one or more such blowing agents can be used, if desired.

Further, the amount of polyhalogenated blowing agent incorporated into the polymer foam forming mixtures is critical as far as formation or lack of formation, of the characteristic noncellular surface layer of the novel foams of the invention is concerned. Thus, in order to produce a noncellular surface layer having the characteristics set forth hereinabove, it is necessary to employ at least about 6 percent by weight and preferably about 10 percent by weight, based on total foam reactants, of a polyhalogenated hydrocarbon blowing agent in the polymer foam mix. The maximum amount of polyhalogenated hydrocarbon blowing agent which can be employed in the polymer foam mix is about 15 percent by weight, based on total foam reactants although higher amounts, up to about 20 percent by weight, based on total reactants, can be employed in certain instances. The precise amount of polyhalogenated hydrocarbon blowing agent within the above range employed in any particular instance will depend upon the degree of packing of the mold, as discussed hereinafter, and on the overall density desired in the ultimate foam of the invention. The most advantageous amount of said blowing agent employed in any given instance is readily determined by a process of trial and error.

The third manner in which the previously known polyisocyanurate foam forming systems are modified in order to produce the rigid self-skinned polymer foams of the invention, is the use of a closed mold having a volume less than that which would be occupied by the resultant foam if the polymer foam forming reaction mixture were allowed to rise freely. The latter requirement is more usually expressed by saying that foaming is carried out under conditions of "packing" or "overfill." The amount of overfill or packing can be defined conveniently by the following equation:

$$\% \text{ Pack} = Y - X/X \times 100$$

wherein $X$ = weight of material required to fill the mold under free rise conditions $Y$ = weight of material actually placed in the mold.

Advantageously the percentage pack, in accordance with the above equation, employed in the preparation of the novel polymer foams of the invention is of the order of at least 50 percent and as high as 800 percent, and is preferably of the order of about 100 percent to about 300 percent. The choice of percent pack will obviously control the final density of the foam article produced as will be obvious to one skilled in the art.

In carrying out the process of the invention any of the molds and the materials employed conventionally in the construction of said molds can be employed. Advantageously the molds are fabricated from materials which are good thermal conductors and will act as "heat sinks." Examples of such materials are cast aluminum, steel and steel alloys, metal-filled epoxy resins, electroform nickel/copper and the like.

The molds can be employed at temperatures within the range of about 20° C. to about 100° C. However, in a preferred form of the invention, the mold is advantageously heated to a temperature within the range of 50° C. to about 70° C. before charging the polymer foam reaction mix to the mold.

As stated previously, subject to the observance of the three main critical requirements listed above, any of the polyisocyanurate foam forming systems known in the art can be adapted to the preparation of the novel rigid self-skinned polymer foams of the invention. Thus, any of the organic polyisocyanates known in the art can be employed as the polyisocyanate component of the foam reaction mixture; see, for example, those set forth in U.S. Pat. No. 3,423,344.

Rigid self-skinned polymer foams of the invention having particularly useful properties, in particular having markedly superior resistance to heat, are obtained when the organic polyisocyanate employed in the preparation thereof is a methylenebis(phenyl isocyanate) or a mixture of polymethylene polyphenyl polyisocyanates containing a methylenebis(phenyl isocyanate) as a component thereof. Such polyisocyanates are inclusive of 4,4'-methylenebis(phenyl isocyanate); mixtures of the latter with the corresponding 2,4'- and 2,2'-isomers; modified forms of methylenebis(phenyl isocyanates) particularly methylenebis(phenyl isocyanates) which have been treated to render them stable liquids at ambient temperatures such as those described in U.S. Pat. Nos. 3,384,653, 3,394,164, and 3,394,165; and mixtures of polymethylene polyphenyl isocyanates containing from about 35 percent to about 85 percent by weight of methylenebis(phenyl isocyanates) the remainder of said mixture being polymethylene polyphenyl isocyanates of functionality higher than 2.0. The latter mixtures are described in, for example, U.S. Pat. Nos. 2,683,730, 2,950,263, and 3,012,008, and are obtained by phosgenation of the corresponding mixtures of methylene bridged polyphenyl polyamines which, in turn, are obtained by the acid condensation of aniline with formaldehyde. The mixtures of polymethylene polyphenyl isocyanates which can be employed to prepare the rigid self-skinned foams of preferred properties include those mixtures which have been heat treated to render the viscosity more suitable for machine handling. Such treatments are carried out at temperatures from about 150° C. to about 300° C. under such conditions that the viscosity (at 25° C.) is increased to about 800 to 1,500 centipoises.

The catalyst system which is employed in polymerizing the polyisocyanate in preparing the polymer foams of the invention can, as previously stated, be any of those previously known in the art for the trimerization of a polyisocyanate. In a preferred procedure for the preparation of the self-skinned rigid foams of the invention, the catalyst, which can be a single compound or a combination of two or more compounds, is so chosen that the interval between cream time and final rise time in the polymer foam reaction is less than about 30 seconds, and preferably is within the range of about 10 seconds to about 20 seconds. Provided this requirement is met the time interval between the first mixing of the components ("mix time") and the cream time of the reaction mixture is not critical. This latter time interval can be as long as 3 minutes or can be as short as 5 seconds depending on how much time is required after mix to introduce the reaction mixture into the mold and to close the mold. The choice of catalyst, or combination of catalysts, necessary to achieve the above requirements is one which can be readily made by one skilled in the art based on the known performance of catalysts.

The catalysts known in the art to be particularly useful in the preparation of polyisocyanurate foams are those which comprise a mixture of a tertiary organic amine and a monomeric homocyclic polyepoxide.

The tertiary organic amines useful in the catalyst combination include triethylamine, triethylene diamine, N,N,N',N'-tetramethylethylene diamine, N,N,N',N'-tetraethylethylene diamine, N-methylmorpholine, N-ethylmorpholine, N,N,N',N'-tetramethyl guanidine, N,N,N',N'-tetramethyl-1,3-butane diamine, N,N-dimethylethanolamine, N,N-diethyethanolamine, N,N',N''-trialkylaminoalkylhexahydrotriazines such as N,N',N''-tris-(dimethylaminoethyl)hexahydrotriazine, N,N',N''-tris(dimethylaminoethyl)hexahydrotriazine, N,N',N''-tris(dimethylaminopropyl)-hexahydrotriazine, N,N',N''-tris(diethylaminoethyl)hexahydrotriazine, N,N',N''-tris(diethylaminopropyl)hexahydrotriazine and the like, and the mono-, di-, and tri-(dialkylaminoalkyl)-monohydric phenols or thiophenols such as 2-(dimethylaminomethyl)-phenol, 2-(dimethylaminobutyl)phenol, 2-(diethylaminoethyl)-phenol, 2-(diethylaminobutyl) phenol, 2-(dimethylaminomethyl)-thiophenol, 2-(diethylaminoethyl)thiophenol, 2,4-bis(dimethylaminomethyl)phenol, 2,4-bis(diethylaminobutyl)phenol, 2,4-bis-(dipropylaminoethyl)phenol, 2,4-bis(dimethylaminoethyl)thiophenol, 2,4-bis(diethylaminopropyl)thiophenol, 2,4-bis(dipropylaminoethyl)thiophenol, 2,4,6-tris(dimethylaminoethyl)-phenol, 2,4,6-tris(diethylaminoethyl)phenol, 2,4,6-tris(dimethylaminobutyl)phenol, 2,4,6-tris(dipropylaminoethyl)phenol, 2,4,6-tris(diethylaminoethyl)thiophenol, 2,4,6-tris(dimethylaminoethyl)thiophenol and the like.

In choosing the catalyst combination to meet the requirements set forth, it is well to note that the desired behavior of the catalyst system can be achieved not only by appropriate selection of the components of the catalyst mixture but by control of the concentration of catalyst employed in the reaction mixture. The present concentration of any particular catalyst or catalyst combination required to achieve the desired time interval between cream time and final rise time can be determined readily by a process of trial and error.

Preferred catalyst combinations for use in the preparation of self-skinned rigid foams in accordance with the present invention are: combinations of (i) a tertiary amine selected from N,N', N''-tris(dialkylaminoalkyl)hexahydrotriazines, N,N-dialkylethanolamines, and triethylenediamine and mixtures thereof with (ii) an epoxide selected from glycidyl ethers of nonfused polynuclear phenols and of novolac resins.

Illustrative of the monomeric homocyclic polyepoxides which are particularly advantageous in preparing the polymer foams of the invention are:

1. the glycidyl ethers of polyhydric mononuclear and fused ring phenols such as resorcinol, hydroquinone, pyrocatechol, saligenin, phloroglucinol, 1,5-dihydroxynaphthalene, 1,6-dihydroxynaphthalene, 1,7-dihydroxynaphthalene and the like;

2. the glycidyl ethers of nonfused polynuclear phenols represented by the general formula:

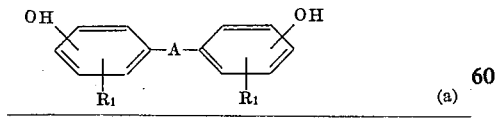
(a)

wherein $R_1$ represents from 0 to 4 substituents selected from the class consisting of halogen and lower-alkyl, A is a bridging group selected from the class consisting

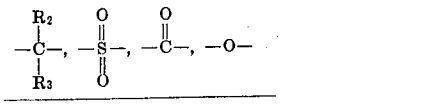

and a single covalent bond, wherein $R_2$ and $R_3$ each represent a moiety selected from the class consisting of hydrogen, lower-alkyl, lower-cycloalkyl and aryl. Illustrative of such compounds are the bis(glycidyl ethers) of:

4,4'-dihydroxydiphenylsulfone,
4,4'-dihydroxybiphenyl,
4,4'-dihydroxybenzophenone,
di(4-hydroxyphenyl)methane (bisphenol F),
2,2-di(4-hydroxyphenyl)butane (bisphenol B),
2,2-di(4-hydroxyphenyl)propane (bisphenol A),
1,1-di(4-hydroxyphenyl)propane,
3,3-di(3-hydroxyphenyl)pentane,
2-(3-hydroxyphenyl)-2-(4'-hydroxyphenyl)butane,
1-phenyl-1-(2-hydroxyphenyl)-1-(3'-hydroxyphenyl)-propane,
1-phenyl-1,1-di(4-hydroxyphenyl)butane,
1-phenyl-1,1-di(4-hydroxyphenyl)pentane,
1-tolyl-1,1-di(4-hydroxyphenyl)ethane,
bis(3-bromo-4-hydroxyphenyl)methane,
2,2-bis(3-bromo-4-hydroxyphenyl)propane,
bis(3-bromo-4-hydroxyphenyl)diphenylmethane,
1,1-bis(3-bromo-4-hydroxyphenyl)-1-(2,5-dibromophenyl)ethane,
2,2-bis(3-bromo-4-hydroxyphenyl)propionitrile,
bis(3,5-dibromo-4-hydroxyphenyl)methane,
2,2-bis(3,5-dibromo-4-hydroxyphenyl)propane,
bis(3,5-dibromo-4-hydroxyphenyl)methane,
1,1-bis(3,5-dibromo-4-hydroxyphenyl)-1-(2,5-dibromophenyl)ethane,
bis(3-bromo-4-hydroxyphenyl)sulfone,
bis(3,5-dibromo-4-hydroxyphenyl)sulfone;

3. the glycidyl ethers of novolac resins. The novolac resins are the product obtained by acid condensation of phenol, or a substituted phenol, with formaldehyde and are conventionally represented by the general formula:

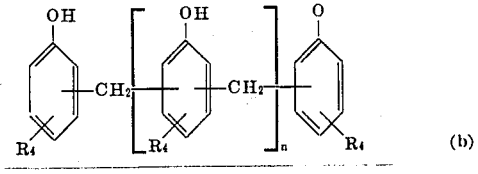
(b)

wherein $n$ has an average value of from about 8 to 12 and $R_4$ represents from 0 to 4 substituents selected from halogen and lower-alkyl groups. It is to be understood that the above formula is highly idealized and is an approximation only; see, for example, Carswell, "Phenoplasts," pages 29 to 35, Interscience, New York, 1947. A wide range of novolac resins of differing molecular weights is available commercially, all of which are represented approximately by the above formula. Since the class of novolac resins is so well recognized in the art, the epoxides derived therefrom by conversion of the novolacs to their glycidyl ethers (by conventional procedures, e.g., reaction with epichlorohydrin) will be referred to hereafter as "novolac resin glycidyl ethers;"

4. dicyclopentadiene dioxide, i.e., the compound having the formula:

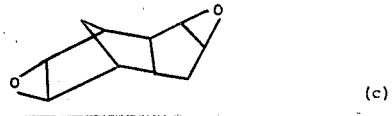
(c)

5. vinyl cyclohexene dioxide, i.e., the compound having the formula:

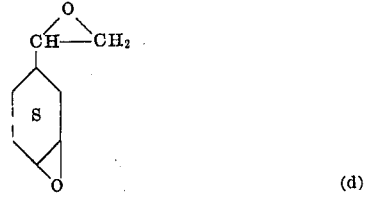
(d)

6. the dicyclohexyl oxide carboxylates represented by the general formula:

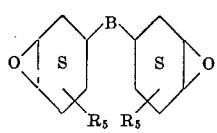

(e)

wherein R_5 in each instance represents from 0 to 9 lower-alkyl groups, and B represents a divalent radical selected from the class consisting of:

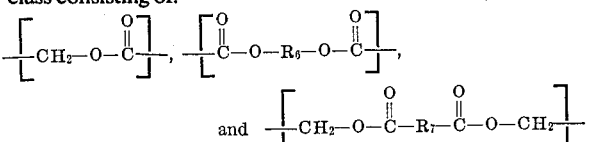

wherein $R_6$ is selected from the class consisting of lower-alkylene and lower-oxyalkylene and $R_7$ is selected from the class consisting of lower-alkylene and arylene. Examples of the dicyclohexyl oxide carboxylates are:

3,4-epoxycyclohexylmethyl 3,4-epoxycyclohexane-carboxylate, 3,4-epoxy-6-methylcyclohexylmethyl 3,4-epoxy-6-methylcyclohexylcarboxylate, bis(3,4-epoxycyclohexylmethyl)maleate, bis(3,4-epoxycyclohexylmethyl)succinate, ethylene glycol bis(3,4-epoxycyclohexanecarboxylate), 2-ehtyl-1,3-hexanediol bis(3,4-epoxy-6-methylcyclo-hexanecarboxylate) and the like.

The term "lower-alkyl" is used throughout this specification and claims as meaning alkyl containing from 1 to 6 carbon atoms such as methyl, ethyl, propyl, butyl, pentyl, hexyl and isomeric forms thereof. The term "halogen" means fluorine, chlorine, bromine, and iodine. The term "lower-alkylene" means alkylene containing from 1 to 6 carbon atoms such as methylene, ethylene, 1,3-propylene, 1,4-butylene, 2,3-butylene, 1,6-hexylene and the like. The term "lower-cycloalkyl" means cycloalkyl from 4 to 8 carbon atoms such as cyclobutyl, cyclopentyl, cyclohexyl, cycloheptyl and cyclooctyl. The term "lower-oxyalkylene" means lower alkylene, as defined above, interrupted by the radical —O—. The term "arylene" means a bivalent radical, such as phenylene, tolylene, xylylene, biphenylylene and the like, derived from an aromatic hydrocarbon by removal of a hydrogen atom from each of two carbon atoms of the nucleus. The term "aryl" means the moiety obtained by removing one hydrogen atom from an aromatic hydrocarbon of from 6 to 12 carbon atoms, inclusive. Illustrative of aryl moieties are phenyl, tolyl, xylyl, biphenylyl, naphthyl and the like.

The monomeric homocyclic polyepoxides described and exemplified hereinabove are, for the most part, well known in the art and can be prepared by methods well known in the art; see, for example, Lee and Neville, "Epoxy Resins", McGraw-Hill Book Company, New York (1957), U.S. Pat. Nos. 2,633,458, 2,716,123, 2,745,847, 2,745,285, 2,872,427, 2,902,518, 2,884,408, 3,268,619, 3,325,452, and British Pat. No. 614,235.

It is to be noted that, although the preferred catalyst combination includes both a tertiary amine and an epoxide, it is possible to achieve the formation of the desired rigid polymer foams using a tertiary amine along as catalyst. Under these circumstances the preferred tertiary amines are the N,N',N''-tris(dialkylaminoalkyl)hexahydrotriazines. When the tertiary amine is employed alone as the catalyst, the concentration thereof which is employed in the polymer foam mix is advantageously within the range of about 0.01 amine equivalents to 0.25 amine equivalents of nitrogen per equivalent of polyisocyanate and preferably from about 0.05 amine equivalents to about 0.15 amine equivalents per equivalent of polyisocyanate. By "amine equivalent" of the tertiary amine is meant the chemical equivalent, i.e., the molecular weight of the tertiary amine divided by the number of tertiary amino groups present in the molecule. When the tertiary amine is employed in combination with an epoxide in the catalyst mixture, the amount of tertiary amine employed is advantageously within the range of about 0.02 amine equivalent to about 0.09 amine equivalents per equivalent of polyisocyanate, and the amount of epoxide is advantageously within the range of about 0.1 moles to about 0.25 moles per equivalent of polyisocyanate.

As previously mentioned, a minor amount of a polyol, up to about 0.3 equivalent per equivalent of polyisocyanate and preferably from about 0.09 to about 0.2 equivalent per equivalent of polyisocyanate, can be present in the polymer foam forming reaction mixture if desired. The polyol is advantageously one having an average hydroxyl equivalent weight from about 30 to about 1,500 and having from about 2 to about 8 hydroxyl groups per molecule. Illustrative of said polyols are:

1. polyethers, for example, polyoxyalkylene glycols such as the polyoxyethylene glycols prepared by the addition of ethylene oxide to water, ethylene glycol or diethylene glycol, polyoxypropylene glycols prepared by the addition of 1,2-propylene oxide to water, propylene glycol or dipropylene glycol, mixed oxyethylene-oxypropylene polyglycols prepared in a similar manner utilizing a mixture of ethylene oxide and 1,2-propylene oxide; polyether glycols prepared by reacting ethylene oxide, propylene oxide or mixtures thereof with mono- and polynuclear polyhydric phenols, e.g., catechol, resorcinol, hydroquinone, orcinol, 2,2-bis(hydroxyphenyl) propane, bis(p-hydroxyphenyl)methane and the like; polyethers prepared by reacting ethylene oxide, propylene oxide or mixtures thereof with aliphatic polyols such as glycerol, trimethylolpropane, 1,2,6-hexanetriol, pentaerythritol, sorbitol, sucrose or the alkyl glycosides, e.g., the methyl, ethyl, propyl, butyl, and 2-ethylhexyl arabinosides, xylosides, fructosides, glucosides, rhamnosides, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl)-5-methyl-4-hydroxytetrahydropyran, and 3,3,5,5-tetrakis(hydroxymethyl)-4-hydroxytetrahydropyran, or polyols containing an aromatic nucleus such as 2,2-bis(hydroxyphenyl)-ethanol, pyrogallol, phloroglucinol, tris(hydroxyphenyl)-alkanes, e.g., 1,1,3-tris(hydroxyphenyl)ethanes, and 1,1,3-tris(hydroxyphenyl)propanes etc., tetrakis(hydroxyphenyl)alkanes, e.g., 1,1,3,3-tetrakis(hydroxy-3-methylphenyl)propanes, 1,1,4,4-tetrakis(hydroxyphenyl)butanes and the like;

2. polyol mixtures comprising a polyol adduct produced by mixing under hydroxyalkylation conditions from 2 to 20 molecular equivalents of ethylene oxide, propylene oxide, or 1,2-butylene oxide, or mixtures thereof, and one amine equivalent of a polyamine mixture, 100 parts of said polyamine mixture containing from 30 to 90 parts of methylenedianilines, the remaining parts being triamines and polyamines of higher molecular weight, said polyamine mixture having been formed by acid condensation of aniline and formaldehyde;

3. polyols obtained by the Mannich condensation of a phenolic compound with formaldehyde and alkanolamine, and the alkylene oxide adducts thereof; see, for example, U.S. Pat. No. 3,297,597;

4. hydroxyalkylated aliphatic diamines such as N,N,N',N'-tetrakis(2-hydroxypropyl)ethylenediamine;

5. hydroxyalkylated isocyanuric acid such as tris(2-hydroxyethyl)isocyanurate and the like;

6. polyester polyols prepared from dibasic carboxylic acids and polyhydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids can be used also. The polyol component or components of the polyester are preferably trihydric alcohols such as trimethylolethane, trimethylolpropane, mannitol, 1,2,6-hexanetriol, glycerol, and petaerythritol. Mixtures of two or more such polyols can be used. In addition a mixture of one or more of said trihydric alcohols with a minor amount of a dihydric alcohol such as ethylene glycol, diethylene glycol, 1,2-propylene glycol, 1,4-butanediol, cyclohexanediol and the like, can also be used in esterification of the dibasic carboxylic acid.

Particularly useful polyols for employment in the process of the invention are those polyols containing phosphorus and/or chlorine and bromine such as: the polyester polyols based on chlorendic acid, tetrabromophthalic acid and tetrachloro phthalic acid or the corresponding anhydrides thereof; see, for example, U.S. Pat. Nos. 2,865,869, 3,018,256, 3,058,925, 3,098,047, and 3,214,392. Generally, said polyester polyols are solid and require blending with a lower viscosity polyol before mixing with the various other components of the high temperature resistant cellular reaction mixture. Any of the above polyethers having viscosities, at 25° C., below about 20,000 centipoises can be used as diluents for the aforesaid halogenated polyester polyols provided that the overall hydroxyl functionality and equivalent weight of the resulting mixtures fall within the limits set forth above.

Illustrative of polyether polyols which can be used as diluents for the above halogenated polyester polyols are the polyoxyalkylene glycols such as diethylene glycol, dipropylene glycol and the like, the alkoxylated aliphatic polyols such as glycerol, sorbitol, trimethylolpropane, pentaerythritol, 1,2,6-hexanetriol and the like. Generally speaking, however, the preferred polyether polyols are the polyoxyalkylene glycols employed in an amount corresponding to from about 20 to about 50 percent by weight of the polyol mixture. The preferred polyester polyols are those comprising the product of reaction of chlorendic acid or the anhydride thereof and a polyhydric alcohol such as glycerol, trimethylolethane, trimethylolpropane and 1,2,6-hexanetriol.

When a polyol, as defined hereinabove, is employed as a component of the foam producing mixture, said polyol can be added as a separate component to the reaction mixture, or it can be blended with any one or more of the other components, or it can be blended with any one or more of the other components, or it can be prereacted in part or in toto with the polyisocyanate to form an isocyanate-terminated prepolymer which is subsequently added to the other components of the reaction mixture.

In addition to, or in place of, the above polyols, there can also be present in the polymer foam forming reacting mixture a minor amount, from about 0.01 to about 0.2 equivalents per equivalent of polyisocyanate, of a polycarboxylic derivative, i.e., an organic moiety containing at least two carboxylic moieties selected from the class consisting of free carboxy groups and anhydride groups. Said polycarboxylic derivatives are inclusive of aromatic, aliphatic, cycloaliphatic or heterocyclic polycarboxylic acids as well as the intramolecular and/or intermolecular anhydrides thereof, provided that, in the case of those anhydrides which contain a single anhydride group there is also present in the molecule at least one free carboxy group.

Examples of polycarboxylic derivatives which can be employed as the free carboxylic acids or as intermolecular anhydrides formed from the same or different acids are: isophthalic acid, terephthalic acid, trimesic acid and phthalic acid. Examples of polycarboxylic derivatives which can be employed as the free carboxylic acids or intramolecular anhydrides thereof are:

trimellitic acid and the anhydride thereof,
pyromellitic acid and the dianhydride thereof,
mellophanic acid and the anhydride thereof,
benzene-1,2,3,4-tetracarboxylic acid and the dianhydride thereof,
benzene-1,2,3-tricarboxylic acid and the anhydride thereof,
diphenyl-3,3',4,4'-tetracarboxylic acid and the dianhydride thereof,
diphenyl-2,2',3,3'-tetracarboxylic acid and the dianhydride thereof,
naphthalene-2,3,6,7-tetracarboxylic acid and the dianhydride thereof,
naphthalene-1,2,4,5-tetracarboxylic acid and the dianhydride thereof,
naphthalene-1,4,5,8-tetracarboxylic acid and the dianhydride thereof,
decahydronaphthalene-1,4,5,8-tetracarboxylic acid and the dianhydride thereof,
4,8-dimethyl-1,2,3,5,6,7-hexahydronaphthalene-1,2,5,6-tetracarboxylic acid and the dianhydride thereof,
2,6-dichloronaphthalene-1,4,5,8-tetracarboxylic acid and the dianhydride thereof,
2,7-dichloronaphthalene-1,4,5,8-tetracarboxylic acid and the dianhydride thereof,
2,3,6,7-tetrachloronaphthalene-1,4,5,8-tetracarboxylic acid and the dianhydride thereof,
phenanthrene-1,3,9,10-tetracarboxylic acid and the dianhydride thereof,
perylene-3,4,9,10-tetracarboxylic acid and the dianhydride thereof,
bis(2,3-dicarboxyphenyl)methane and the dianhydride thereof,
bis(3,4-dicarboxyphenyl)methane and the dianhydride thereof,
1,1-bis(2,3-dicarboxyphenyl)ethane and the dianhydride thereof,
1,1-bis(3,4-dicarboxyphenyl)ethane and the dianhydride thereof,
2,2-bis(2,3-dicarboxyphenyl)propane and the dianhydride thereof,
2,3-bis(3,4-dicarboxyphenyl)propane and the dianhydride thereof,
bis(3,4-dicarboxyphenyl)sulfone and the dianhydride thereof,
bis(3,4-dicarboxyphenyl)ether and the dianhydride thereof,
ethylene tetracarboxylic acid and the dianhydride thereof,
butane-1,2,3,4-tetracarboxylic acid and the dianhydride thereof,
cyclopentane-1,2,3,4-tetracarboxylic acid and the dianhydride thereof,
pyrrolidine-2,3,4,5-tetracarboxylic acid and the dianhydride thereof,
pyrazine-2,3,5,6-tetracarboxylic acid and the dianhydride thereof,
mellitic acid and the trianhydride thereof,
thiophen-2,3,4,5-tetracarboxylic acid and the dianhydride thereof, and
benzophenone-3,3',4,4'-tetracarboxylic acid and the dianhydride thereof.

Other anhydrides which may be employed in the practice of the invention are: the intermolecular anhydride of trimellitic acid 1,2-anhydride (see, for example U.S. Pat. No. 3,155,687), the bisanhydrides disclosed in U.S. Pat. No. 3,277,117 [e.g., 4,4'-ethylene glycol bis-anhydro trimellitate and 4,4'-(2-acetyl-1,3-glycerol) bis-anhydro trimellitate] and the di-adducts of maleic acid or anhydride with styrene.

While any of the polycarboxylic acids and intramolecular or intermolecular anhydrides thereof defined and exemplified above can be employed in the preparation of the polymers of the invention, a preferred group of compounds for this purpose are intramolecular anhydrides which are derived from polycarboxylic acids having at least 3 carboxyl groups of which at least two carboxyl groups are attached directly to an aromatic nucleus in orthoposition with respect to each other. A particularly preferred group of polycarboxylic acid intramolecular anhydrides are those selected from the class consisting of anhydrides having the following formulas:

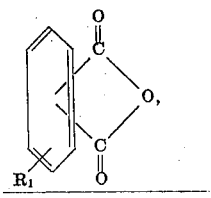 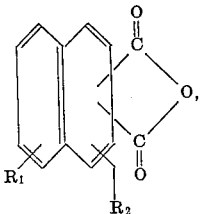

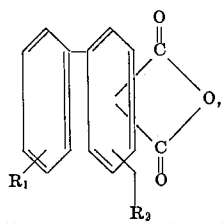 and 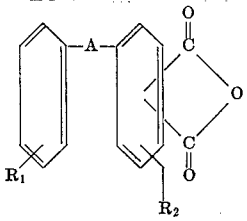

wherein at least one of $R_1$ and $R_2$ represents a group selected from the class consisting of carboxyl and the group

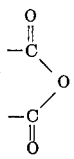

wherein the carbon atoms of the latter are each attached to adjacent carbon atoms in an aromatic ring, and wherein $R_1$ and $R_2$ additionally represent from 0 to 3 substituents selected from the group consisting of halogen and lower-alkyl and A is a bridging group selected from the class consisting of lower-alkylene, carbonyl, sulfonyl and oxygen.

The term "lower-alkyl" means alkyl containing from 1 to 6 carbon atoms, inclusive, such as methyl, ethyl, propyl, butyl, pentyl, hexyl, and isomeric forms thereof. The term "halogen" means fluorine, chlorine, bromine, and iodine. The term "lower-alkylene" means alkylene containing from 1 to 6 carbon atoms, inclusive, such as methylene, ethylene, 1,3-propylene, 1,4-butylene, 2,3-butylene, 1,6-hexylene and the like.

Conventional additives such as dispersing agents, cell stabilizers, surfactants, flame retardants and the like, which are commonly employed in the fabrication of polymer foams, can be incorporated into the foam reaction mixture employed to prepare the novel polymer foams of the invention.

In a further embodiment of the invention, the novel rigid self-skinned foams of the invention have incorporated therein a reinforcing agent. The latter can take the form of any of the fillers which are conventionally employed in polymer foam technology. Examples of such fillers are carbon black, including the various grades of channel black, gypsum, natural clays including the various hard clays, kaolin, china clay and the like, chopped rubber scrap and the like, natural silica, asbestos and the like. Said fillers are readily incorporated into the rigid foams of the invention simply by adding same to the foam reaction mix. Said reinforcing agent can also take the form of fibrous materials such as glass fiber, asbestos fiber, mineral fiber, fibers prepared by extrusion or spinning of synthetic materials such as nylon, polyester and the like and fibers prepared from minerals such as boron, carbon, graphite, beryllium and the like, which are particularly useful in improving or enhancing the high temperature resistant properties of the rigid foams of the invention. The said fibrous materials can be employed in short pieces or in chopped form in which case they are readily incorporated into the rigid foams of the invention by direct addition of the chopped fibrous material to the polymer foam reaction mixture.

In a preferred embodiment the reinforcing agent employed in the polymer foams of the invention takes the form of a web element of fibrous or cellular material. Said web can take the form of a nonwoven, random association of fibrous material such as is found in fiberglass insulation matting, curled hair fillers such as horse-hair, hogs hair and like animal hair, asbestos and bolts of randomly arranged synthetic fibers such as nylon, rayon, cellulose acetate, acrylonitrile-vinyl chloride copolymers, acrylonitrile, polyvinylidene chloride - polyvinyl chloride copolymers, and the like. Alternatively, and preferably, said web can take the form of a structured assembly which preferably has come intrinsic strength, e.g., compressive strength, tear strength and the like. Illustratively, said web can take the form of woven or molded sheets or mats of fiber glass or synthetic fibers such as nylon, rayon and the like materials set forth above. Such webs can be impregnated with epoxy resins, polyester resins and the like, to impart increased rigidity thereto prior to being incorporated in the foam. A particularly useful example of a structured web reinforcing element is the class of materials known as spacer fabrics, which materials find wide use in upholstery and related arts. These materials are obtained by preparing a composite flat fabric employing two or more different fibers and then selectively shrinking the fabric to form a three dimensional honeycomb structure. Illustrative of this type of material is that which is marketed under the name Space Fabric, originally named Trilock. This material is prepared by weaving a fabric having polyethylene or like synthetic fiber as the warp and a second fiber which is shrinkable in hot water as the weft. The woven fabric is immersed in boiling water thereby cockling the fabric and producing a three-dimensional figure, see, Moncrieff, Man-made Fibers, John Wiley and Sons, New York, 1959, page 453.

Figure 3:
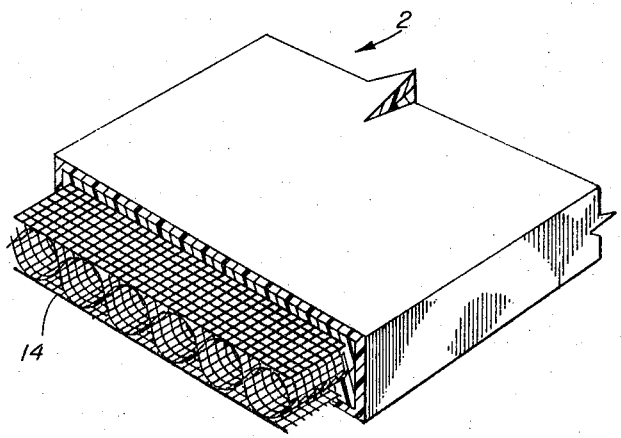
FIG. 3 shows a perspective view of a reinforcing element employed in reinforcing polymer foams of the invention.

The cross-sectional perspective view shown in FIG. 3 illustrates a polymer foam 2 of the invention having a spacer fabric reinforcing element 14 of the selectively shrunk synthetic fiber-type embedded therein.

Another particularly useful form of reinforcing element is one or a plurality of helically wound synthetic fiber elements such as those shown in U.S. Pat. No. 3,449,199.

Further examples of structured reinforcing webs useful in the preparation of reinforced polymer foams of the invention are reticulated polymer foams such as open-celled flexible polyurethane foams, particularly those obtained by reticulation, and open-celled polyimide and polyamide foams.

The above types of structured reinforcing elements are incorporated into the polymer foams by placing the element in the mold in which the integrally skinned foam is to be prepared and then introducing the polymer foam reaction mix to the mold. Surprisingly, it has been found that, in carrying out such a process, the structured element generally becomes completely and substantially symmetrically, disposed in the resulting polymer foam. One would reasonably expect that the structured element would float during the rising of the polymer foam and be forced up against the upper surface of the mold with consequent intrusion of the element into or through the corresponding surface of the polymer foam. On the contrary, it is found that no form of restraint is required in the mold to retain the reinforcing element centrally located in the mold. Indeed, simply by cutting the reinforcing element to dimensions such that there is an amount of clearance between the mold faces and the surface of the reinforcing element corresponding to the desired thickness of skin in the ultimate polymer foam, placing the element in the mold, and pouring the polymer foam mix therein, it is possible to obtain an integrally skinned foam in which the reinforcing element is located substantially symmetrically within the cellular core and does not protrude into or through the microcellular skin of the integrally skinned foam. This is an unexpected and highly useful finding and greatly simplifies the production of such reinforced integrally skinned foams of the invention.

In preparing polymer foams of the invention having reinforcing web elements of the above type embedded in the inner cellular core, it is advantageous, but not essential, that the reinforcing element extend throughout substantially the whole of said inner cellular core in order to obtain a substantially uniformly reinforced article. However, as will be apparent to one skilled in the art, many of the applications to which the polymers foams of the invention can be put will require reinforcement at selected points which have to bear localized stress. In such instances localized reinforcement can be achieved by incorporating an appropriate web reinforcing element at these particular areas.

The following examples describe the manner and process of making and using the invention and set forth the best mode contemplated by the inventors of carrying out the invention but are not to be construed as limiting.

EXAMPLE 1

An integrally skinned rigid polyisocyanurate foam was prepared using the following foam ingredients and proportions (all parts by weight).

| | |
|---|---|
| Polyol (PG-460[1]) | 37.2 |
| Triazine[2] catalyst | 5.0 |
| Triethylene diamine[3] | 2.0 |
| Surfactant[4] | 2.0 |
| Polyepoxide[5] | 9.0 |
| Stabilized trichlorofluoromethane | 20.0 |
| Polymethylene polyphenyl polyisocyanate (equivalent weight = 133) | 134.0 |

Footnotes:

[1]Methylglucoside based polyoxypropylene polyether, hydroxyl equivalent weight = 124

[2]N,N',N''-tris(dimethylaminopropyl)-S-hexahydrotriazine

[3]20 percent w/w solution in diethanolamine

[4]Organosilicone: L-5410

[5]Epoxy novolac type resin (Epon 152)

The foam reaction ingredients were mixed using a standard foam metering and dispensing modulating unit. The polyisocyanate was fed at 58° F. as one stream to the mixing head and the remainder of the components were premixed and fed at 50° F. as a second stream. The rate of feeding of the two streams was maintained in the correct ratio to maintain the above proportions of reactants.

The above foam mix was dispensed to a closed mold (6 inches × 6 inches × ¼ inch). The mold was preheated to 100° F. A total of 100 g. of foam mix was charged to the mold. The cream time of the foam mix was 20 seconds and the rise time 40 seconds. The foam was demolded 5 minutes after filling and was cured at room temperature (circa 25° C.) for 7 days. The foam was found to have excellent skin surface, free from bubbles and flaws, with fine uniform cells in the core; overall density 41 pcf.

The foam produced as described above was found to have the following mechanical, thermal, and electrical properties using the test methods which are indicated.

MECHANICAL PROPERTIES

| | ASTM Method | Value |
|---|---|---|
| Density, pcf | D-1622 | |
| Overall | | 34 |
| Core | | 16 |
| Tensile Strength, p.s.i. | D-1623 | |
| Overall | | 1,500 |
| Core | | 470 |
| Skin | | 8,500 |
| Tensile Modulus, p.s.i. (×10$^4$) | D-1623 | |
| Overall | | 2.75 |
| Core | | 7.03 |
| Skin | | 8.20 |
| Elongation, % | D-1623 | |
| Overall | | 3.0 |
| Core | | 3.8 |
| Skin | | 3.3 |
| Compressive Strength, p.s.i. | D-1621 | |
| Perpendicular to skin surfaces | | 1,700 |
| Parallel to skin surfaces | | 4,200 |
| Compression Modulus, p.s.i. (×10$^4$) | D-1621 | |
| Perpendicular to skin surfaces | | 4.55 |
| Parallel to skin surfaces | | 6.95 |
| Flexural Strength, p.s.i. | D-790 | |
| Perpendicular to skin surface | | 7,000 |
| Flexural Modulus, p.s.i. (×10$^5$) | D-790 | |
| Perpendicular to skin surface | | 2.55 |
| Shear Strength, p.s.i. | C-273 | 440 |
| Shear Modulus, p.s.i. | C-273 | 1,500 |

THERMAL PROPERTIES

| | ASTM Method | Value |
|---|---|---|
| Heat Distortion Temperature, °F. (No Load) | — | >300 |
| K-Factor, BTU/Ft.$^2$Hr.°F./In | * | 0.25 |
| Burn Through Time, Hours (Per Inch Thickness) | ** | 5.25 |
| Flame Test, Inches Burned | D-1692 | 0.1 (Nonburning) |
| Coefficient of Linear Thermal Expansion, In./In./°F. (// to Skin Surfaces) | D-696 | 2.5×10$^{-5}$ |
| Thermal Gravimetric Analysis, % Weight Loss at: | *** | |
| 200° C. | | 2 |
| 300° C. | | 4 |
| 400° C. | | 8 |
| 500° C. | | 26 |
| 600° C. | | 59 |
| 700° C. | | 70 |

*DuPont Modified Guarded Hot Plate: DuPont Bulletin BA-3

**Bureau of Mines Flame Penetration Test, supra

*** Test carried out as follows: The foam sample (20–40 mg.) is suspended from a Cahn RG Electrobalance in a small electrical wire coil furnace. The electrobalance is connected to a Speed-O-Max W strip chart recorder (Leeds and Northrup Co., Philadelphia, Pa.). The furnace temperatures were controlled by the voltage applied to the furnace heater. The furnace temperature was raised from room temperature to approximately 1,000° Philadelphia, in 7 minutes, and sample weight losses were automatically recorded on the strip chart.

ELECTRICAL PROPERTIES

| | ASTM Method | Value |
|---|---|---|
| Volume Resistivity, ohm-cm. | D-257 | 6.5×10$^{13}$ |
| Surface Resistivity, ohms | D-257 | 2.9×10$^{13}$ |
| Dielectric Strength, Volts/mil | D-149 | 138 |
| Dielectric Constant, 73° F., 50% R.H. | D-150 | |
| 60 Hz. | | 2.75 |
| 1 MHz. | | 2.56 |
| Dielectric Constant, 150° F. | D-150 | |
| 60 Hz. | | 3.14 |
| 1 MHz. | | 1.99 |
| Dissipation Factor, 73° F., 50% R.H. | D-150 | |
| 60 Hz. | | 0.0070 |
| 1 MHz. | | 0.0150 |
| Dissipation Factor, 150° F. | D-150 | |
| 60 Hz. | | 0.0120 |
| 1 MHz. | | 0.0130 |

EXAMPLE 2

The preparation of a self-skinned rigid polyisocyanurate foam of the invention was repeated exactly as described in Example 1 except that the mold there employed was replaced by one of dimensions ( 6 inches × 6 inches × 2 inches ) having a solid cylindrical pin (diameter one-eighth in., length 1 in.) was attached by one end to the center of the inner face of one half of the mold so that it projected into the core of the mold. The self-skinned rigid polyisocyanurate foam so produced had a hollow cylindrical cavity in the center of one face. A 1-inch No. 5 rounded-headed screw was screwed into said cavity using a screwdriver. The foam with screw in place was then subjected to the screw retention test described in ASTM D 1761 and cohesive failure was not observed until the withdrawal force exerted on the screw exceeded 170 pounds. The cohesive failure occurred in the body of the foam and surrounding skin and the screw remained firmly threaded in the cavity after the failure occurred.

EXAMPLE 3

An integrally skinned rigid polyisocyanurate foam was prepared as follows. The following foam ingredients were used in the proportions stated (all parts by weight):

| | |
|---|---|
| Polyol (methyl glucoside based polyoxy propylene polyether; OH number =129) : | 38.4 |
| N,N',N''-tris(diemthylaminopropyl)-s-hexahydrotriazine : | 5.0 |
| Triethylene diamine : | 3.0 |
| Epoxy novolac resin (DEN 431) : | 9.0 |
| Dimethylpolysiloxane polyethylene oxide surfactant (SF-1109) : | 2.0 |
| Trichlorofluoromethane : | 20.0 |
| Polymethylene polyphenyl isocyanate (equivalent weight =133) : | 134.0 |

The foam reaction components were mixed using a standard foam metering and dispensing modulating unit. The polyisocyanate was employed alone as one stream and fed to the mixing head at 68° F. The remainder of the foam reaction components were preblended and fed to the mixing head at 40° F. as a second stream. The rate of feeding of the two streams was maintained constant at the ratio necessary to maintain the above proportions of reactants.

The foam mix was dispensed to a closed aluminum mold (16 inches × 12 inches × ¼ inch) having a series of reinforcing ribs projecting outwardly from one of the large surfaces thereof. The mold was preheated to 120° F. A total of 626 g. of foam mix was charged to the mold. The foam was demolded 5 minutes after filling and was cured at room temperature (circa 25° C.) for 7 days. The resulting foam had excellent skin surface quality free from sink marks, bubbles, and flaws with a uniform thickness of skin observed when a cross-sectional cut was made. The foam core exposed by the cut showed fine uniform cells. The overall density of the integrally skinned foam was found to be 42 pcf.

EXAMPLE 4

A reinforced rigid integrally skinned polyisocyanurate foam was prepared as follows. The foam formulation and procedure described in Example 1 was repeated. The mold employed was an aluminum vented mold of dimensions 6 inches × 6 inches × ½ inch. Prior to introducing the foam mix into the mold, a piece (approximate dimensions 5½ inches × 5½ inches × 5/16 inch) of Space Fabric Style 6007–1–1 (Uniroyal, Textile Administrative Center, Winnsboro, South Carolina; a three-dimensional fabric obtained by heat shrinking a fabric woven from a warp of polyethylene filament and a weft of Saran monofilament) was placed loosely in the mold. A total of 200 g. of foam mix was dispensed into the mold and the mold was closed. There was thus obtained an integrally skinned polyisocyanurate foam having the reinforcing element embedded substantially symmetrically within the core thereof.

The above preparation was repeated but replacing the Space Fabric with a piece of approximately the same dimensions of reticulated polyurethane foam, a piece of fiber glass batt (resin coated, standard insulating quality) and a piece of woven horsehair open weave padding. In each case the reinforcing element was found to be embedded substantially symmetrically within the foam core.

EXAMPLE 5

Integrally skinned rigid polyisocyanurate foams were prepared using the procedure and mold described in Example 1 but replacing the foam formulation there employed by an equal amount of the following formulations (all parts by weight)

a.

| | |
|---|---|
| Polymethylene polyphenyl isocyanate [equivalent weight =141; viscosity 1,000 c.p.s. at 25° C.; containing approximately 45% methylenebis(phenyl isocyanate)] : | 141 |
| Polyepoxide (tetrabromo bisphenol A epichlorohydrin adduct: DER 542) : | 30 |
| Polyester (chlorendic acid-trimethylol propane ester prepared as described under Resin A of U.S. 3,214,392) : | 23 |
| Trichlorofluoromethane : | 28 |
| Dimethylaminomethylphenol (o-, p-isomer mixture: DMP-10) : | 7 |
| Organosilicone surfactant (SF-1109) : | 2 | b.

| | |
|---|---|
| Liquefied methylenebis(phenyl isocyanate) [equivalent weight =143: prepared as described in U.S. Pat. No. 3,384,653] : | 73.4 |
| Polyol (pentaerythritol/propylene oxide adduct; hydroxyl number =560; Pep–450) : | 5.1 |
| Organosilicone surfactant (SF-1109) : | 1.4 |
| Epoxy novolac resin (Epon-152) : | 3.8 |
| Triethylenediamine : | 1.8 |
| Trichloromonofluoroethane : | 14.5 | c.

| | |
|---|---|
| Polymethylene polyphenyl isocyanate [see (a) above] : | 141 |
| Polyester [same as (a) above] : | 23 |
| Vinyl cyclohexene dioxide : | 11.3 |
| Organosilicone surfactant (SF-1109) : | 2 |
| Trichlorofluoromethane : | 27 |
| Dimethylaminomethylphenol (o-, p-isomer mixture: DMP-10) : | 7 | d. Same formulation as (c) but replacing the vinylcyclohexene dioxide by 14 parts by weight of bisphenol A epichlorohydrin adduct (DER-332).

EXAMPLE 6

A center board for a small sailboat was fabricated in a one-shot operation from a self-skinned rigid polyisocyanurate foam as follows:

A vented aluminum mold having a total capacity of 152 cu. in. was preheated to 115° F. and charged with 1,170 g. of a foam mix which had been obtained from the following foam reaction components (all parts by weight).

| | |
|---|---|
| Polyol (methyl glucoside based polyoxy propylene polyether: OH number =129) : | 38.4 |
| N,N',N''-tris(dimethylaminopropyl)-s-hexahydrotriazine : | 4 |
| Triethylene diamine (20% solution in alkanolamine) : | 3 |
| Trichlorofluoromethane : | 14 |
| Pigment (Verona Black) : | 1 |
| Epoxy novolac resin (DEN 431) : | 9 |
| Organosilicone surfactant (SF-1109) : | 2 |
| Polymethylene polyphenyl polyisocyanate (equivalent weight =133) : | 134 |

The epoxide, polyisocyanate and surfactant were preblended and fed at 65° F. as a single stream to a standard mixing head. The remainder of the ingredients were combined and fed at 85° F. as a second stream to the mixing head. The rate of feeding of the two streams to the mixing head was maintained constant at the ratio necessary to maintain the above proportions of reactants.

The resulting foam was demolded 5 minutes after pouring and was allowed to cure at room temperature (circa 25° C.) for 24 hours. The molding had excellent skin properties from from bubbles and sink marks.

EXAMPLE 7

Using the formulation and foam mixing procedure described in Example 6, there was prepared an automobile glove box from integral skin rigid polyisocyanurate foam. The vented aluminum mold which was employed had a total capacity of 168 cu. in. and was preheated to 120° F. before being charged with 281 g. of the foam mix described in Example 6. The resulting molding was removed from the mold 5 minutes after pouring and was allowed to cure in air (circa 25° C.) for 24 hours. The overall density of the foam so obtained was 34 pcf. The skin was found to be excellent, free from bubbles, sink marks and the like.

EXAMPLE 8

Using the formulation and foam mixing procedure described in Example 6, there was prepared an automobile airscoop from integrally skinned rigid polyisocyanurate foam. The mold employed was a vented aluminum mold of total internal capacity 166 cu. in. The mold was preheated to 120° F. before being charged with 1,110 g. of foam mix prepared as described in Example 6. The airscoop was demolded 5 minutes after pouring and was allowed to cure in air (circa 25° C.) for 24 hours. Skin properties were found to be excellent.

A corner section of the airscoop was cut away using a bandsaw. The section so removed was placed in an oven at 300° F. for 1 hour and then removed and allowed to cool to room temperature (circa 25° C.). The section so treated showed no sign of distortion and could be fitted back in place on the major portion of the airscoop.

We claim:

1. A rigid structural polymeric material having a continuous integrally formed microcellular polymeric outer layer of substantially uniform density within the range of about 60 pounds per cubic foot to 65 pounds per cubic foot and an inner cellular polymeric core of substantially uniform density within the range of about 5 pounds per cubic foot to about 50 pounds per cubic foot and being further characterized by:
   a. an abrupt change of density at the juncture of said microcellular outer layer and said inner cellular core;
   b. a thickness of at least 0.25 millimeters in said microcellular outer layer; and
   c. uniformity of chemical composition of polymer throughout said inner polymeric core and outer polymeric layer, the major recurring chemical linkage of said polymer being an isocyanurate moiety.

2. A structural polymeric material according to claim 1 wherein said polymer contains as a minor recurring chemical linkage an oxazolidinone moiety.

3. A structural polymeric material according to claim 1 wherein said polymer contains as a minor recurring chemical linkage an imide moiety.

4. A structural polymeric material according to claim 1 wherein said polymer contains as a minor recurring chemical linkage a urethane moiety.

5. A structural polymeric material according to claim 1 wherein said microcellular polymeric outer layer has a Shore D hardness of at least 75.

6. A structural polymeric material according to claim 1 wherein said inner cellular polymeric core has a density of about 15 pcf to about 30 pcf.

7. A structural polymeric material according to claim 1 which has incorporated therein a reinforcing element.

8. A structural polymeric material having a continuous integrally formed microcellular polymeric outer layer of substantially uniform density within the range of about 60 pcf. to 65 pounds per cubic foot and an inner cellular polymeric core of substantially uniform density within the range of about 5 pounds per cubic foot to about 50 pounds per cubic foot and being further characterized by:
   a. an abrupt change of density at the juncture of said microcellular outer layer and said inner cellular core;
   b. a thickness of at least 0.25 millimeters in said microcellular outer layer;
   c. uniformity of chemical composition of polymer throughout said inner polymer core and outer polymeric layer, the major recurring chemical linkage of said polymer being an isocyanurate moiety; and
   d. a reinforcing web element embedded in said inner cellular polymeric core.

9. A structural polymeric material according to claim 8 wherein said reinforcing web element is fibrous.

10. A structural polymeric material according to claim 8 wherein said reinforcing web element is an open-celled polymer foam.

11. A structural polymeric material according to claim 8 wherein said reinforcing web element is derived by heat shrinking a fabric woven from fibers of different heat shrink properties in the warp and weft thereof.

* * * * *